(12) United States Patent
Zhang et al.

(10) Patent No.: US 11,822,910 B2
(45) Date of Patent: Nov. 21, 2023

(54) REDUCING A DELIVERY SIZE OF A SOFTWARE UPDATE

(71) Applicant: International Business Machines Corporation, Armonk, NY (US)

(72) Inventors: Bao Zhang, Beijing (CN); Jin Hong Fu, Beijing (CN); Shi Chong Ma, Beijing (CN); He Huang, BeiJing (CN); Yong Yin, Beijing (CN); Jia Tian Zhong, Beijing (CN); Xing Xing Shen, Beijing (CN); Jia Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 17/501,018

(22) Filed: Oct. 14, 2021

(65) Prior Publication Data

US 2023/0118695 A1    Apr. 20, 2023

(51) Int. Cl.
*G06F 8/41* (2018.01)
*G06F 8/658* (2018.01)

(52) U.S. Cl.
CPC ............ *G06F 8/48* (2013.01); *G06F 8/433* (2013.01); *G06F 8/447* (2013.01); *G06F 8/658* (2018.02)

(58) Field of Classification Search
CPC . G06F 8/48; G06F 8/433; G06F 8/447; G06F 8/658
See application file for complete search history.

(56) References Cited

U.S. PATENT DOCUMENTS

| | | |
|---|---|---|
| 5,519,866 A | 5/1996 | Lawrence et al. |
| 5,561,800 A | 10/1996 | Sabatella |
| 6,349,311 B1 * | 2/2002 | Sobel ............. G06F 16/23 707/999.203 |
| 6,651,249 B2 | 11/2003 | Waldin et al. |
| 9,262,149 B2 | 2/2016 | Bates et al. |
| 2003/0022663 A1 * | 1/2003 | Rajaram ........... G06F 9/44521 455/418 |
| 2003/0070160 A1 | 4/2003 | Berstis |
| 2013/0125109 A1 | 5/2013 | Scian et al. |

(Continued)

FOREIGN PATENT DOCUMENTS

| | | | |
|---|---|---|---|
| CN | 109491695 A | 8/2021 | |
| GB | 2602842 A * | 7/2022 | ........ G06F 8/658 |
| WO | WO-2015200234 A1 * | 12/2015 | ........ G06F 8/41 |

OTHER PUBLICATIONS

Brendan James Moran (UK Patent Application Publication No. 2602842 A) (Year: 2022).*

(Continued)

*Primary Examiner* — Ziaul A Chowdhury
(74) *Attorney, Agent, or Firm* — CANTOR COLBURN LLP; Teddi Maranzano

(57) ABSTRACT

Aspects of the invention include includes detecting a change in a code section of a source code in relation to a reference code section. An incremental section is created in object code, the incremental section includes an object code section describing the change in the code section and a symbol section describing a change to a symbol associated with the changed code section. The incremental section is attached to a software update. The software update to a target computer system.

20 Claims, 7 Drawing Sheets

(56) References Cited

U.S. PATENT DOCUMENTS

2014/0157232 A1\* 6/2014 Li .............................. G06F 8/48
717/110
2020/0356358 A1 11/2020 Giri et al.

OTHER PUBLICATIONS

Chen et al., "Sequencer: Sequence-to-Sequence Learning for End-to-End Program Repair" IEEE Transactions on Software Engineering, vol. TBD, (2019): pp. 1-17.
Microsoft, "/Incremental (Link Incrementally)"https://docs.microsoft.com/en-us/cpp/build/reference/incremental-link-incrementally?view=msvc-160 (Retrieved Aug. 5, 2021), 3 pages.

\* cited by examiner

| Changed class | Code 402 | | | |
|---|---|---|---|---|
| # | offset | length | action | Content/to offset |
| 1 | 0x3200 | 0x08 | Add | 078D 3200 47F4 52B8 |
| 2 | 0x3200 | 0x20 | Move | 0x08 |
| 3 | 0x5600 | 0x04 | Replace | 58F0 0210 |
| 4 | 0x5600 | 0x04 | Delete | 5840 0310 |
| Changed class | External Symbol Dictionary 404 | | | |
| 1 | 0x0020 | @@FEB | Add | |
| 2 | 0x0100 | ISHABC | Delete | |
| Changed class | Compiling information 406 | | | |
| 1 | 0x24 | 0x08 | Replace | 42000000 |

400

REDUCING A DELIVERY SIZE OF A SOFTWARE UPDATE

BACKGROUND

The present invention generally relates to programmable computing systems, and more specifically, to programmable computing systems configured to reduce the delivery size of a software update.

Software engineers use computing tools to manage the lifecycle of a software application from its inception to the end of its life. These computing tools permit remotely located engineers to collaboratively develop an application by sharing resources through a central repository. After the software application is deployed, the engineers continue to use these tools to correct application errors and improve the application's functionality.

In certain instances, the software engineers may create a software update that calls for a small snippet of code to be changed. However, the code snippet may impact a much larger portion of dependent source code which needs to be changed as well. This increases the overall size of the software update and impacts the delivery and execution of the update at a target computer system. This impact includes the large amount of memory that the software update consumes during delivery and execution. Additionally, the target computer system must allocate a larger amount of processing resources for a larger amount of time to accommodate both the delivery and execution of a larger software update.

SUMMARY

Embodiments of the present invention are directed to a computer-implemented method for reducing a size of a software update. A non-limiting example of the computer-implemented method includes detecting a change in a code section of a source code in relation to a reference code section. An incremental section is created in object code, the incremental section includes an object code section describing the change in the code section and a symbol section describing a change to a symbol associated with the changed code section. The incremental section is attached to a software update. The software update to a target computer system.

By using the incremental section, the target computer system only needs to relocate those portions of code that are being updated. Furthermore, the target computer system only needs to perform symbol evaluation for code that is being changed. The target computer that receives the software update, uses its binder to install the package, and the target computer's compiler is not used to install the updated section of code In addition to one or more of the features described above or below, or as an alternative, the creation of the incremental section is initiated after compiling the source code to object code.

In addition to one or more of the features described above or below, or as an alternative, the method further includes compiling the source code to object code. The object code is compared to a reference object code to identify the changed code section. Including the changed code section in the incremental section is determined based on the identification.

In addition to one or more of the features described above or below, or as an alternative, the method further includes that creation of the incremental section is initiated prior to compiling the source code into object code.

In addition to one or more of the features described above or below, or as an alternative, the method further includes generating a symbol table based on the source code, wherein the symbol table comprises a set of nodes. A symbol table node of the set of nodes is compared to a node of a reference symbol table of a reference dependency graph, wherein the symbol table node is associated with the changed code section. A path from the reference symbol table node to a reference binary code node of the reference dependency graph is traversed, wherein the binary code node is dependent from the symbol table node. The changed code section needs to be compiled to object code and included in the incremental section is determined based on the binary code node being dependent from the symbol table node.

In addition to one or more of the features described above or below, or as an alternative, the method further includes calling a daemon to initiate creating the incremental section.

In addition to one or more of the features described above or below, or as an alternative, the method is performed by an incremental compiler or a standard compiler.

Embodiments of the present invention are directed to system for reducing a size of a software update. A non-limiting example of the system includes a memory having computer readable instructions; and one or more processors for executing the computer readable instructions, the computer readable instructions controlling the one or more processors to perform operations including: detecting a change in a code section of a source code in relation to a reference code section. An incremental section is created in object code, the incremental section includes an object code section describing the change in the code section and a symbol section describing a change to a symbol associated with the changed code section. The incremental section is attached to a software update. The software update to a target computer system.

In addition to one or more of the features described above or below, or as an alternative, the creation of the incremental section is initiated after compiling the source code to object code.

In addition to one or more of the features described above or below, or as an alternative, the operations further include compiling the source code to object code. The object code is compared to a reference object code to identify the changed code section. Including the changed code section in the incremental section is determined based on the identification.

In addition to one or more of the features described above or below, or as an alternative, creation of the incremental section is initiated prior to compiling the source code into object code.

In addition to one or more of the features described above or below, or as an alternative, the operations further include generating a symbol table based on the source code, wherein the symbol table comprises a set of nodes. A symbol table node of the set of nodes is compared to a node of a reference symbol table of a reference dependency graph, wherein the symbol table node is associated with the changed code section. A path from the reference symbol table node to a reference binary code node of the reference dependency graph is traversed, wherein the binary code node is dependent from the symbol table node. The changed code section needs to be compiled to object code and included in the incremental section is determined based on the binary code node being dependent from the symbol table node.

In addition to one or more of the features described above or below, or as an alternative, the operations further include calling a daemon to initiate creating the incremental section.

In addition to one or more of the features described above or below, or as an alternative, the operations are performed by an incremental compiler or a standard compiler.

Embodiments of the present invention are directed to a computer program product for reducing a size of a software update. A non-limiting example of the computer program product includes a computer readable storage medium having program instructions embodied therewith, the program instructions executable by a processor to cause the processor to perform operations comprising: detecting a change in a code section of a source code in relation to a reference code section. An incremental section is created in object code, the incremental section includes an object code section describing the change in the code section and a symbol section describing a change to a symbol associated with the changed code section. The incremental section is attached to a software update. The software update to a target computer system.

In addition to one or more of the features described above or below, or as an alternative, the creation of the incremental section is initiated after compiling the source code to object code.

In addition to one or more of the features described above or below, or as an alternative, the operations further include compiling the source code to object code. The object code is compared to a reference object code to identify the changed code section. Including the changed code section in the incremental section is determined based on the identification.

In addition to one or more of the features described above or below, or as an alternative, creation of the incremental section is initiated prior to compiling the source code into object code.

In addition to one or more of the features described above or below, or as an alternative, the operations further include generating a symbol table based on the source code, wherein the symbol table comprises a set of nodes. A symbol table node of the set of nodes is compared to a node of a reference symbol table of a reference dependency graph, wherein the symbol table node is associated with the changed code section. A path from the reference symbol table node to a reference binary code node of the reference dependency graph is traversed, wherein the binary code node is dependent from the symbol table node. The changed code section needs to be compiled to object code and included in the incremental section is determined based on the binary code node being dependent from the symbol table node.

In addition to one or more of the features described above or below, or as an alternative, the operations further include calling a daemon to initiate creating the incremental section.

In addition to one or more of the features described above or below, or as an alternative, the operations are performed by an incremental compiler or a standard compiler.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
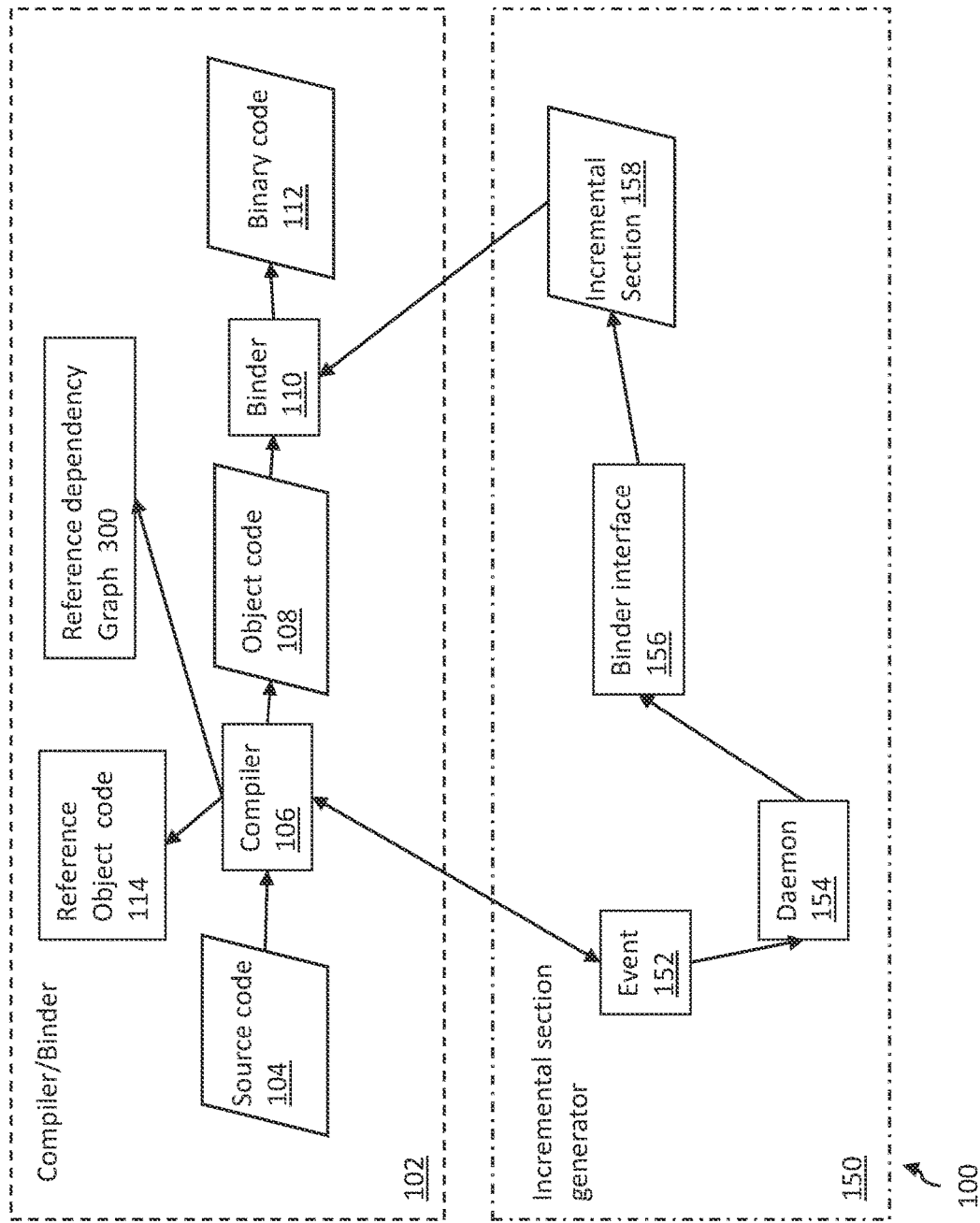
FIG. 1 illustrates a system for reducing the size of a software update according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computing systems, and computer program products that determine which section of source code is being modified. The modifications to the source code are identified in an incremental section, which is attached to the software update. The software update is delivered to a target computer that reads the incremental section to guide the target computer through the update process.

A software patch is a set of code intended to modify the source code of a target application. The modifications can be temporary or permanent, and are used for various purposes including security performance, correcting an error, and improving a functionality. Large software updates increase the overall size of a software update and impact the delivery and execution of the update at a target computer system. In response to receiving a software update, a target computer systems relocate the source code from one section of memory to another section of the memory. This includes the portions of the source code that remain unchanged. For larger applications, this consumes a large amount of available memory at the target computer system. In addition to relocation, the target computer system performs symbol evaluation on the entire source code by assigning proper addresses to all external entities the source code refers to. In other words, assigning proper addresses for every position in the loaded source code where a reference to an external symbol was made. As a result, the target computer system expends large amounts of time and consumes a large amount of computing resources due to the size of the source code being updated.

One or more embodiments of the present invention address one or more of the above-described shortcomings by providing computer-implemented methods, computing systems, and computer program products for an incremental compiler configured for reducing the size of a patch. The compiler detects updated code of a software update for a target application or computer system. A binder creates an incremental section that written in object code and describes the changes to the source code. A package builder creates a software patch that includes the incremental section and any updated object code. The software patch is delivered to a target computer system. A link-editor at the target computer system updates the target application or computer system using the software patch. By reading the incremental section, the target computer system only reads the portions of the source code to be updated into memory. Furthermore relocation and symbol evaluation is only performed if the length of the updated code section has changed from the length of the original code section.

Referring to FIG. 1, a system 100 for reducing the size of a software update is shown in accordance with one or more embodiments of the present invention. The system 100 includes a compiler 106 and binder 110 for performing a first process 102 that includes converting a source code 104 to object code 108, and detecting that the source code 104 has changed from a previous version of the code. The system 100 further includes a daemon 154 for executing a second process 150 of identifying the changed portions of the code, and initiating the creation of an incremental section 158 for cataloging the changes.

During the first process 102, the compiler 106 receives the source code 104 for converting into the object code 108. The source code 104 is code written in a high-level language understandable by a programmer and the object code 108 is machine-level code that has not been linked into a binary code 112 (i.e., machine code). The source code 104 includes updated code to be delivered to a target application or computer system.

In the event that the compiler 106 detects a modified section of source code 104, the compiler 106 triggers the second process 150 by generating an event 152 that calls a daemon 154. The daemon 154 is a background process that calls a binder interface 156 to generate an incremental section 158. The binder interface 156 is an algorithm that reads the modified section of the source code 104, identifies the changes to the source code 104. The binder interface 156 then creates an incremental section 158 written in object code that describes those differences. The incremental section 158 is a stand-alone file or part of an object code used to guide a compiler of a target computing system to update a target program using the software update.

The compiler 106 shown in FIG. 1 can be implemented as a standard compiler or an incremental compiler. Based on whether the compiler 106 is a standard compiler or an incremental compiler, it identifies any changes to the source code 104 at different points in time during the compiling process. In practice, if the standard compiler receives an updated source code, the standard compiler recompiles all of the source code 104 before determining that any changes are present.

Figure 2:
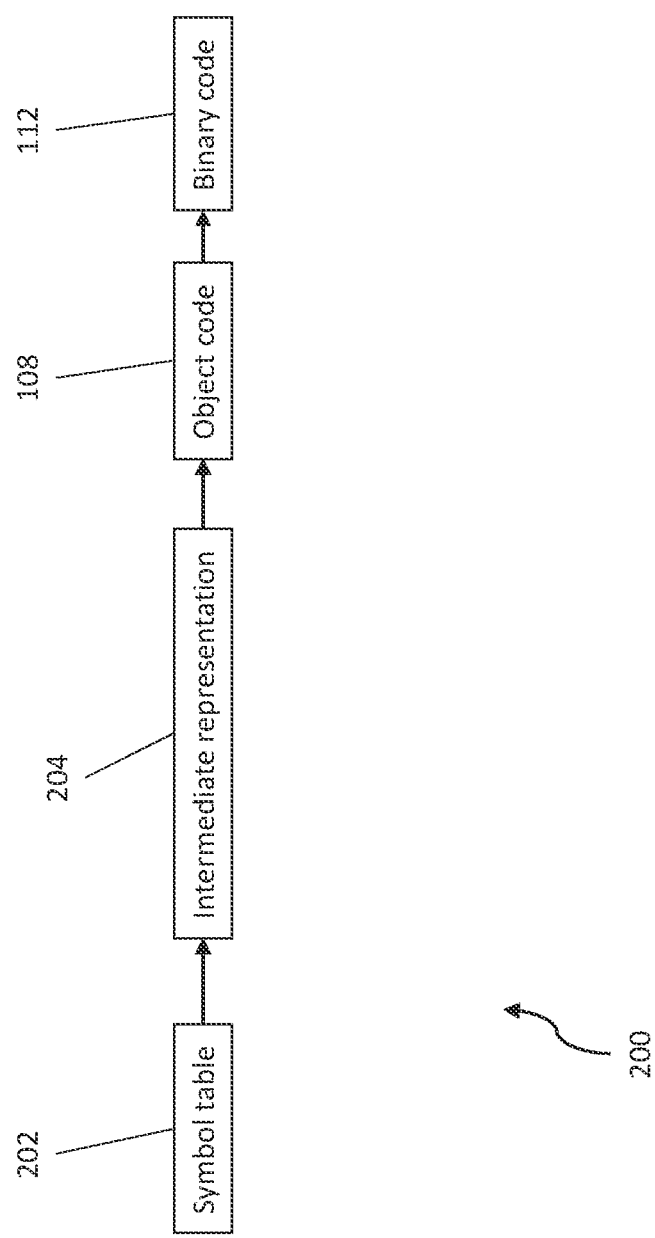
FIG. 2 illustrates a process flow for a standard compiler according to one or more embodiments of the present invention.

Referring to FIG. 2, a standard compiler generally performs four basic steps. First, the standard compiler parses the source code 104 into a symbol table 202. The symbol table 202 is a data structure that is used to store the names of entities in the source code 104, verify if a variable has been declared, verify semantics of assignments and expressions in the source code 104, and determine a scope of a name in the code. The standard compiler then analyzes the symbol table 202, identifies generates an intermediate representation 204 of the source code 104. The standard compiler then converts the intermediate representation 204 into object code 108. Finally, a binder 110 associated with the standard compiler links the object code 108 together to form a binary code 112 for execution by a computer.

After the standard complier converts the intermediate representation 204 into the object code 108, the standard compiler retrieves a reference object code 114 and compares each section of the object code 108 with a comparable section of the reference object code 114 to check for differences. In response to detecting a change in the source code 104, the standard compiler determines that at least a portion of the source code 104 needs to be recompiled for the software update. Upon completing the compiling, the standard compiler then generates an event 152, which call a daemon 154 to invoke a binder interface 156. The binder interface 156 creates the incremental section 158 which describes the differences in the object code 108.

Figure 3:
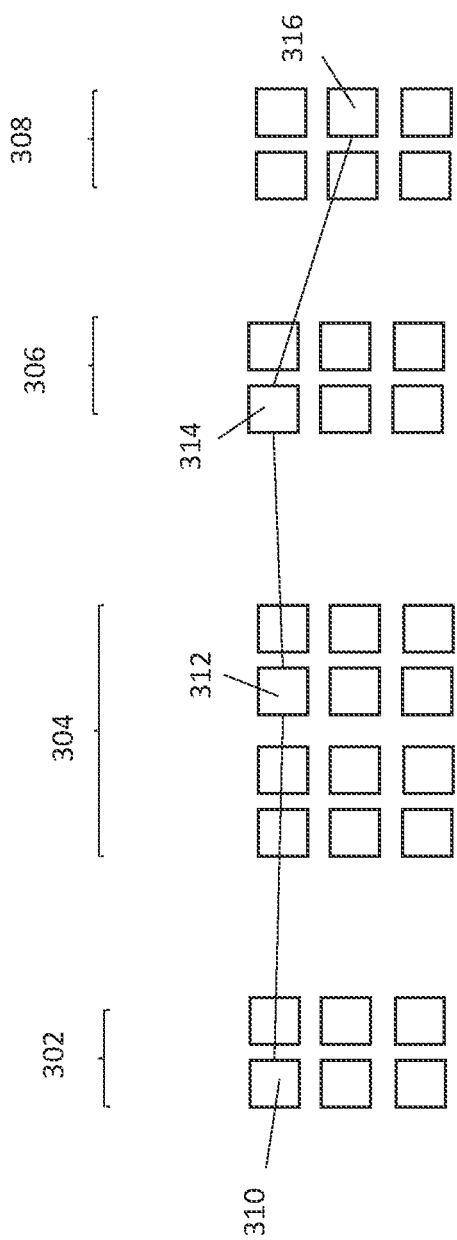
FIG. 3 illustrates a dependency graph for use with an incremental compiler according to one or more embodiments of the present invention.

Alternatively, the compiler 106 shown in FIG. 1 can be an incremental compiler that recognizes differences in the code prior to the source code 104 being recompiled. Rather, the incremental compiler seeks to only recompile the updated portions of the source code 104 and any dependent portions. In accordance with one or more embodiments of the present invention, the incremental compiler creates a reference dependency graph 300 to track each piece of data created for a code that tracks with the reference object code 114. Referring to FIG. 3, the reference dependency graph 300 includes a set of symbol table nodes 302 (input nodes), a set of intermediate representation nodes 304, a set object code nodes 306, and a set of binary code nodes 308. The edges of the reference dependency graph 300 denote a dependency between two nodes. For example, a symbol table node 310 is linked to an intermediate representation node 312 by an edge if the intermediate representation node 312 is dependent from the symbol table node 310. The intermediate representation node 312 is linked to an object code node 314 if the object code node 314 is dependent from the intermediate representation node 312. A binary code node 316 is linked to the object code node 314 if it is dependent from the object code node 314.

The incremental compiler receives source code 104 and begin to generate a symbol table. The incremental compiler retrieves a reference dependency graph 300 and compares the nodes of the generated symbol table with the symbol table nodes 302 of reference dependency graph 300 to detect any changes. The symbol table nodes 302 include variable names and constants, procedure and function names, literal constants and strings, compiler generated temporaries, and source language labels. The intermediate representation nodes 304 represent pieces of source code instructions, in which the portions of the source code have been replaced with symbols. The object code nodes 306 represent pieces of object code prior to linking. The binary code nodes 308 represent pieces of binary code (e.g., instructions written in binary) A compiler uses the symbol table to determine data type, name, declaring procedures, offsets in storage, whether a parameter is passing by value or reference, a number and type of argument passed by a value or reference, and base addresses. For example, the changes can be changes to any of the above-referenced nodes. The changes can be based on an update to the code, or based on an address change due to a code section being relocated from one location to another location in memory. Upon detecting a change, the incremental compiler traverses the reference dependency graph 300, and determines whether any binary code node of the set of binary code nodes 308 is dependent from the changed symbol table node. If a binary code node is dependent from the changed symbol table node, the incremental compiler generates an event 152 to call a daemon 154. The daemon 154 then calls a binder interface 156 generate an incremental section 158.

Regardless of whether the compiler 106 is an incremental compiler or a standard compiler, the compiler 106 detects a change and alerts the daemon 154 to call the binder interface 156 and create the incremental section 158. The binder interface 156 characterizes the detected updated code. Examples of determinations and actions that the binder interface 156 performs include, but are not limited to, the following: if the source code 104 includes code that has the same length as reference code, the binder interface 156 writes "replace(address, length, content)" in the incremental section 158. If a set of code sections are deleted, the binder interface 156 writes "delete(address, length, content)" to the incremental section 158. If there are differences in the external symbol dictionary class, the binder interface 156 describes differences in the incremental section 158. If the binder interface 156 identifies differences in the relocation symbol dictionary class, it describes the differences in the incremental section 158. The binder interface 156 can also describe differences in the compiler information class in the incremental section 158. The binder interface 156 further identifies classes that have changed including, but not limited, to a code external symbol table, and compiling information. The binder interface 156 also identifies any addresses that have changed, any data types that have changed, and any content that has changed. The binder interface 156 further identifies any actions called for by the modifications in the source code 104, such as add, delete, replace, and move.

Figure 4:
FIG. 4 illustrates an incremental section according to one or more embodiments of the present invention.

Referring to FIG. 4, an exemplary incremental section 400 created by a binder interface 156 is shown in accordance with one or more embodiments of the present invention. As seen in the exemplary incremental section 400, the modifications to the source code 104 call for three classes to be changed, the code 402, the external symbol dictionary 404, and the compiling information 406. As an illustration, the exemplary incremental section 400 indicates that the symbol 22FEB is to be added and the symbol ISHABC is to be removed at the target application or computer system. The exemplary incremental section 400 package is a new section of the software update. In some embodiments of the present invention, the incremental section is written in object code or 108 or binary code 112, and in other embodiments the incremental section is an isolated file. The incremental section 158 includes updated code sections in a single location. By using the incremental section 158, the target computer system only needs to relocate those portions of code that are being updated. Furthermore, the target computer system only needs to perform symbol evaluation for code that is being changed. The target computer that receives the software update, uses its binder to install the package, and the target computer's compiler is not used to install the updated section of code.

Figure 5:
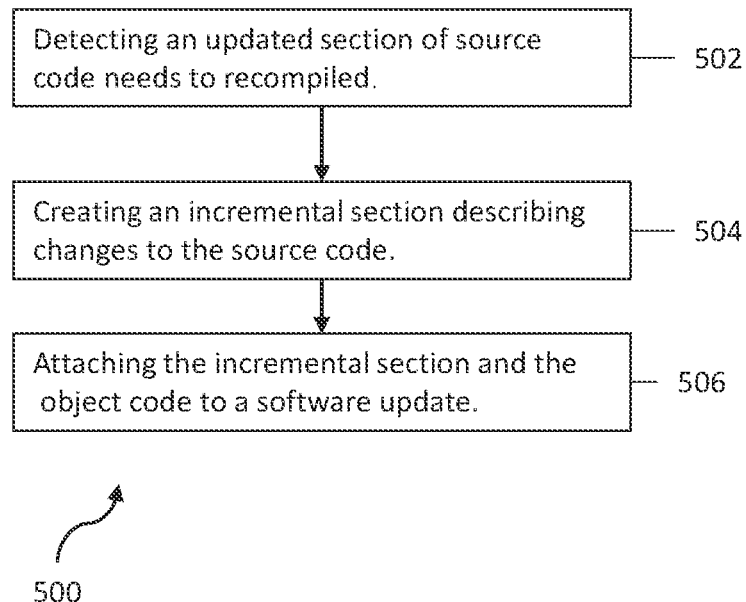
FIG. 5 illustrates a process flow for reducing the size of a software patch according to one or more embodiments of the present invention.

Referring to FIG. 5, a process flow 500 for reducing the size of a software update is shown in accordance with one or more embodiments of the present invention. At block 502, a compiler 106 detects that a portion of source code 104 has been updated. The timing upon which the compiler 106 detects the update depends on whether the compiler 106 is a standard compiler or an incremental compiler. If the compiler 106 is a standard compiler, the standard compiler compiles the source code 104 and then detects the change. If, however, the compiler 106 is an incremental compiler, the incremental compiler detects the change prior to completing compilation of the source code 104. Upon detecting that a portion of the source code 104 has changed, the incremental compiler generates the event 152 to initiate creation of an incremental section 158.

At block 504, a binder interface 156 creates an incremental section 158 to describe the changes to the source code 104. The event 152 calls a daemon 154 to initiate creation of the incremental section 158. The binder interface 156 is called by the daemon 154. The binder interface 156 is an algorithm that describes the code differences in an incremental section 158. The incremental section 158 is a stand-alone file, object code, or binary code used to guide a compiler of a target computing system to update a target application using the software patch.

At block 506, a package builder (not shown) attaches the incremental section 158 to a software update. The software update can be delivered to a target application or computer system.

Figure 6:
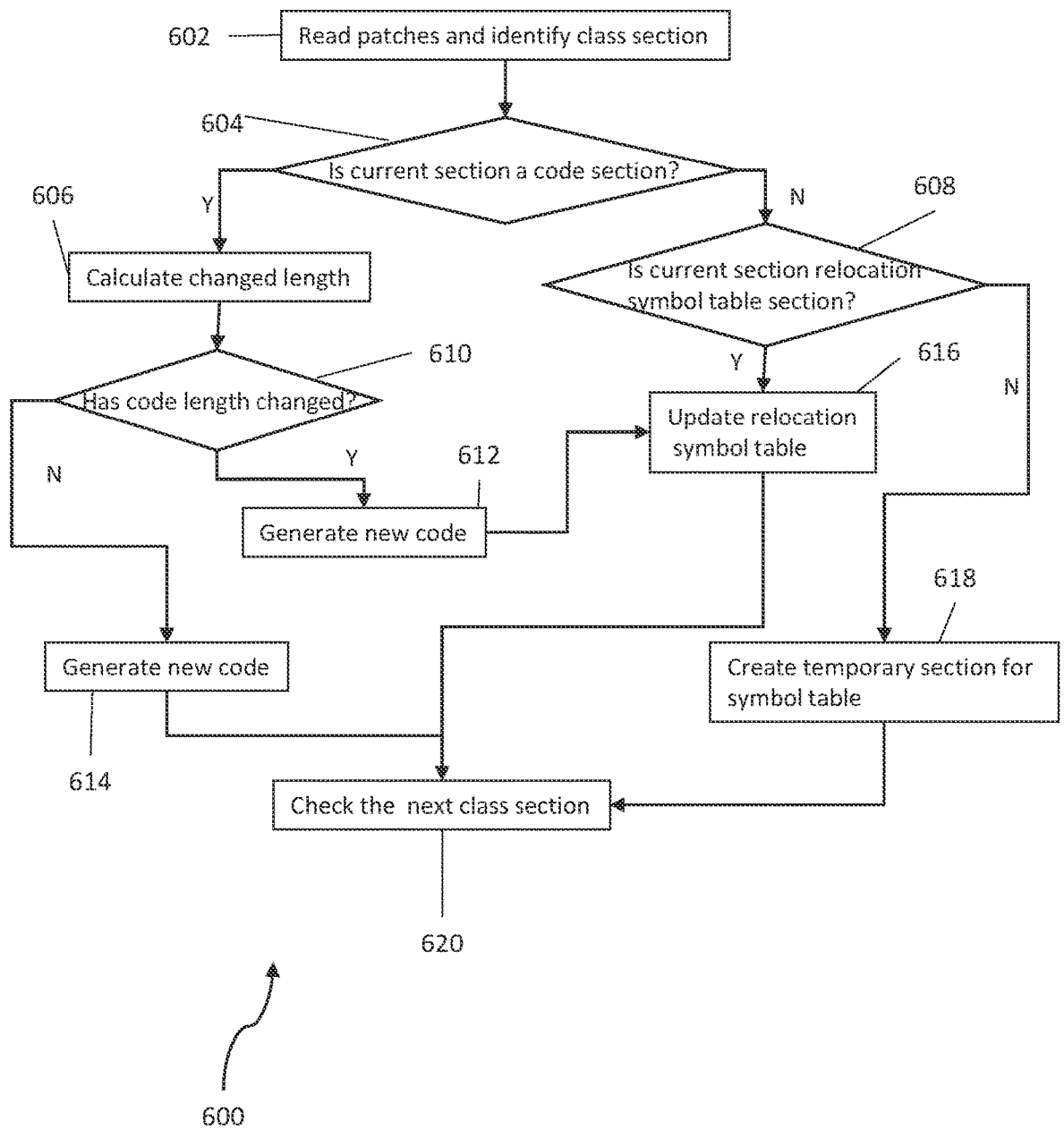
FIG. 6 illustrates a process flow for updating software using the incremental patch according to one or more embodiments of the present invention.

Referring to FIG. 6, a process 600 for a target application or target computer system to use software patch to update the source code is shown in accordance with one or more embodiments of the present invention. At block 602, a link-editor of a target computer system (not shown) receives the software update and reads the software patch and identifies the incremental section 158. For each class section of the incremental section 158, the link-editor identifies the class section name (e.g., external symbol dictionary 404). The link-editor then relocates the original class section from one portion of memory to another portion of memory.

At block 604, the link-editor reads the original class section and determines whether the class section relates to a code section (e.g., code 402). If the class section relates to a code section, the link-editor calculates a length of the original code section at block 606 and proceeds to block 610. At block 610, the link-editor compares the length of the original code section with the length of code as described in the incremental section 158 to determine whether the code length described by the incremental section 158 is greater than or less than the original code length (i.e., has the code length changed?). If the length of the code described by the incremental section 158 has changed, the process proceeds to block 612, and the link-editor updates the original code section for the target application or target computer system. The link-editor uses the instructions from the incremental section 158 (e.g., code 402 of FIG. 4) to update the original code section. From block 612, the process proceeds to block 616, where the link-editor updates the symbol table at the target application or target computer system based on the new code. The incremental section 158 includes the relevant symbols for replacement, and therefore, the link-editor does not need to evaluate all of the symbols of the source code. Rather the link-editor follows the instructions of the incremental section 158 (e.g., external symbol dictionary 404 of FIG. 4) to update the symbols. The process then proceeds to block 620, where the link-editor checks the next class section of the incremental section 158.

At block 610, if the length of the code described by the incremental section 158 has not changed, the process proceeds to block 614, and the link-editor uses the instructions from the incremental section 158 (e.g., code 402 of FIG. 4) to update the original code section. The process then proceeds to block 620, where the link-editor checks the next class section of the incremental section 158.

Returning to block 604, if the current class section is not a code section, the process proceeds to block 608. At block 608, the link-editor reads the class section identifier and determines whether the class section is a symbol table section. If the class section is a symbol table section, the process proceeds to block 616. At block 616, the follows the instructions of the incremental section 158 (e.g., external symbol dictionary 404 of FIG. 4) to update the symbols, and proceeds to block 620. At block 620, the link-editor checks the next class section of the incremental section 158. For example, the link-editor can add symbols, or delete symbols based on the descriptions in the incremental section 158. If, however, the class section is not the symbol section, the process proceeds to block 618. At block 618, the link-editor creates a temporary section for a symbol table. Upon creating the temporary section, the process proceeds to block 620, at which point the link-editor checks the next class section of the incremental section 158.

Figure 7:
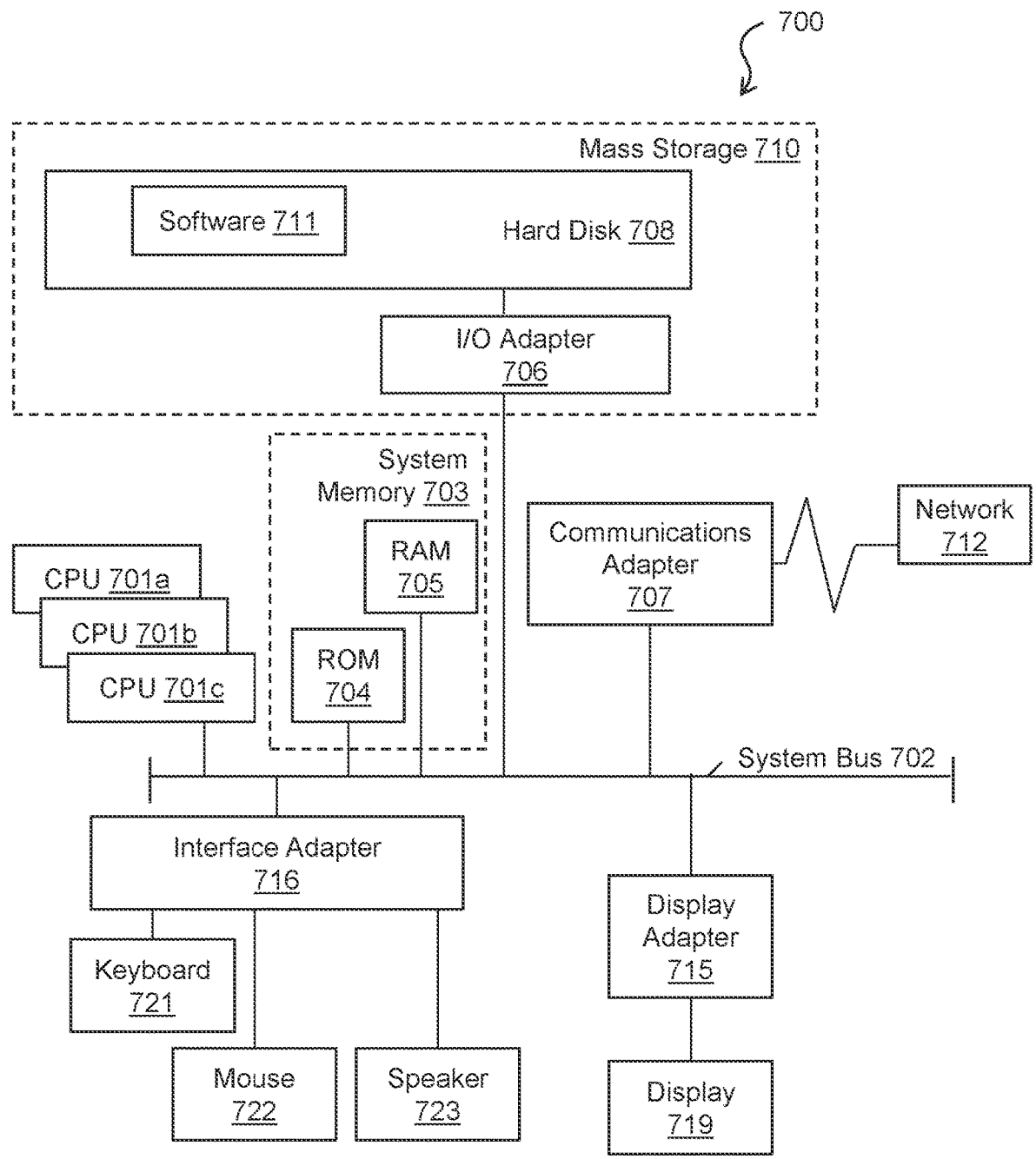
FIG. 7 illustrates a block diagram of a computer system for use in implementing one or more embodiments of the present invention.

In one or more embodiments of the present invention, the hardware/software modules in the system 100 from FIG. 1 can be implemented on the computer system 700 found in FIG. 7. Turning now to FIG. 7, a computer system 700 is generally shown in accordance with an embodiment. The computer system 700 can be an electronic, computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system 700 has one or more central processing units (CPU(s)) 701*a*, 701*b*, 701*c*, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to a system memory 703 and various other components. The system memory 703 can include a read only memory (ROM) 704 and a random access memory (RAM) 705. The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read only memory, flash memory, or any other suitable memory systems.

The computer system 700 comprises an input/output (I/O) adapter 706 and a communications adapter 707 coupled to the system bus 502. The I/O adapter 706 may be a small computer system interface (SCSI) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described herein below with respect to the various Figures. Examples of computer program product and the execution of such instruction is discussed herein in more detail. The communications adapter 507 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system, such as the z/OS or AIX operating system from IBM Corporation, to coordinate the functions of the various components shown in FIG. 7.

Additional input/output devices are shown as connected to the system bus 702 via a display adapter 715 and an interface adapter 516 and. In one embodiment, the adapters 706, 707, 715, and 716 may be connected to one or more I/O buses that are connected to the system bus 702 via an intermediate bus bridge (not shown). A display 719 (e.g., a screen or a display monitor) is connected to the system bus 702 by a display adapter 715, which may include a graphics controller to improve the performance of graphics intensive applications and a video controller. A keyboard 721, a mouse 722, a speaker 723, etc. can be interconnected to the system bus 702 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 7, the computer system 700 includes processing capability in the form of the processors 701, and, storage capability including the system memory 703 and the mass storage 710, input means such as the keyboard 721 and the mouse 722, and output capability including the speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external webserver or a cloud computing node.

It is to be understood that the block diagram of FIG. 7 is not intended to indicate that the computer system 700 is to include all of the components shown in FIG. 7. Rather, the computer system 700 can include any appropriate fewer or additional components not illustrated in FIG. 7 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   detecting, by a processor, a change in a code section of a source code in relation to a reference code section;
   creating, by the processor, an incremental section in object code, the incremental section comprising an object code section describing the change in the code section and a symbol section describing a change to a symbol associated with the changed code section, the incremental section configured to guide a compiler of a target computing system to update a target program without relocating unchanged portions of the source code and without performing a symbol evaluation on the entire source code;

attaching, by the processor, the incremental section to a software update, and transmitting, by the processor, the software update to the target computer system.

2. The computer-implemented method of claim 1, wherein creation of the incremental section is initiated after compiling the source code to object code.

3. The computer-implemented method of claim 2, wherein the method further comprises:

compiling the source code to object code;

comparing the object code to a reference object code to identify the changed code section; and determining to include the changed code section in the incremental section based on the identification.

4. The computer-implemented method of claim 1, wherein creation of the incremental section is initiated prior to compiling the source code into object code.

5. The computer-implemented method of claim 4, wherein the method further comprises:

generating a symbol table based on the source code, wherein the symbol table comprises a set of nodes;

comparing a symbol table node of the set of nodes to a node of a reference symbol table of a reference dependency graph, wherein the symbol table node is associated with the changed code section;

traversing a path from the reference symbol table node to a reference binary code node of the reference dependency graph, wherein the binary code node is dependent from the symbol table node; and determining that the changed code section needs to be compiled to object code and included in the incremental section based on the binary code node being dependent from the symbol table node.

6. The computer-implemented method of claim 1, wherein the method further comprises calling a daemon to initiate creating the incremental section.

7. The computer-implemented method of claim 1, wherein the method is performed by an incremental compiler or a standard compiler.

8. A system comprising:

a memory having computer readable instructions; and one or more processors for executing the computer readable instructions, the computer readable instructions controlling the one or more processors to perform operations comprising:

detecting a change in a code section of a source code in relation to a reference code section;

creating an incremental section in object code, the incremental section comprising an object code section describing the change in the code section and a symbol section describing a change to a symbol associated with the changed code section, the incremental section configured to guide a compiler of a target computing system to update a target program without relocating unchanged portions of the source code and without performing a symbol evaluation on the entire source code;

attaching the incremental section to a software update, and transmitting the software update to the target computer system.

9. The system of claim 8, wherein creation of the incremental section is initiated after compiling the source code to object code.

10. The system of claim 9, wherein the operations further comprise:

compiling the source code to object code;

comparing the object code to a reference object code to identify the changed code section; and determining to include the changed code section in the incremental section based on the identification.

11. The system of claim 8, wherein creation of the incremental section is initiated prior to compiling the source code into object code.

12. The system of claim 11, wherein the operations further comprise:

generating a symbol table based on the source code, wherein the symbol table comprises a set of nodes;

comparing a symbol table node of the set of nodes to a node of a reference symbol table of a reference dependency graph, wherein the symbol table node is associated with the changed code section;

traversing a path from the reference symbol table node to a reference binary code node of the reference dependency graph, wherein the binary code node is dependent from the symbol table node; and determining that the changed code section needs to be compiled to object code and included in the incremental section based on the binary code node being dependent from the symbol table node.

13. The system of claim 8, wherein the operations further comprise calling a daemon to initiate creating the incremental section.

14. The system of claim 8, wherein the operations are performed by an incremental compiler or a standard compiler.

15. A computer program product comprising a computer readable storage medium having program instructions embodied therewith, the program instructions executable by a processor to cause the processor to perform operations comprising:

detecting a change in a code section of a source code in relation to a reference code section;

creating an incremental section in object code, the incremental section comprising an object code section describing the change in the code section and a symbol section describing a change to a symbol associated with the changed code section, the incremental section configured to guide a compiler of a target computing system to update a target program without relocating unchanged portions of the source code and without performing a symbol evaluation on the entire source code;

attaching the incremental section to a software update, and transmitting the software update to the target computer system.

16. The computer program product of claim 15, wherein creation of the incremental section is initiated after compiling the source code to object code.

17. The computer program product of claim 16, wherein the operations further comprise:

compiling the source code to object code;

comparing the object code to a reference object code to identify the changed code section; and determining to include the changed code section in the incremental section based on the identification.

18. The computer program product of claim 15, wherein creation of the incremental section is initiated prior to compiling the source code into object code.

19. The computer program product of claim 18, wherein the operations further comprise:

generating a symbol table based on the source code, wherein the symbol table comprises a set of nodes;

comparing a symbol table node of the set of nodes to a node of a reference symbol table of a reference dependency graph, wherein the symbol table node is associated with the changed code section;

traversing a path from the reference symbol table node to a reference binary code node of the reference dependency graph, wherein the binary code node is dependent from the symbol table node; and determining that the changed code section needs to be compiled to object code and included in the incremental section based on the binary code node being dependent from the symbol table node.

20. The computer program product of claim 15, wherein the operations further comprise calling a daemon to initiate creating the incremental section.

\* \* \* \* \*